United States Patent [19]

Miura et al.

[11] Patent Number: 4,841,804
[45] Date of Patent: Jun. 27, 1989

[54] AUTOMATIC TRANSMISSION FOR MOTOR VEHICLES

[75] Inventors: Masakatsu Miura; Shiro Sakakibara, both of Aichi, Japan

[73] Assignee: Aisin Warner Kabushiki Kaisha, Aichi, Japan

[21] Appl. No.: 80,171

[22] Filed: Jul. 30, 1987

Related U.S. Application Data

[63] Continuation of Ser. No. 919,576, Oct. 15, 1986, which is a continuation of Ser. No. 820,834, Jan. 21, 1986, which is a continuation of Ser. No. 256,179, Apr. 21, 1981.

[30] Foreign Application Priority Data

Apr. 25, 1980 [JP] Japan .................................. 55-55604

[51] Int. Cl.$^4$ ...................... F16H 37/08; F16H 37/00
[52] U.S. Cl. ........................................ 74/701; 74/695; 74/740
[58] Field of Search ................. 74/695, 730, 740, 758, 74/759, 701

[56] References Cited

U.S. PATENT DOCUMENTS

| | | | |
|---|---|---|---|
| 2,120,831 | 6/1938 | Cotterman | 74/695 |
| 3,217,846 | 11/1965 | Smirl | 74/740 |
| 3,640,153 | 2/1972 | Kepner | 74/759 |
| 3,673,890 | 7/1972 | Crooks | 74/740 |
| 4,056,988 | 11/1977 | Kubo et al. | 74/740 |
| 4,223,569 | 9/1980 | Koivunen et al. | 74/695 |
| 4,342,238 | 8/1982 | Gardner | 74/740 X |
| 4,418,585 | 12/1983 | Pierce | 74/759 X |

FOREIGN PATENT DOCUMENTS 1177949 9/1964 Fed. Rep. of Germany ........ 74/695

*Primary Examiner*—Dirk Wright
*Attorney, Agent, or Firm*—Blum Kaplan

[57] ABSTRACT

An automatic transmission for F.F. (front engine-front drive) type motor vehicles, in which a hydraulic torque converter and an auxiliary transmission mechanism are successively coupled with an output shaft of a transversely mounted internal combustion engine with its rotational axis disposed widthwise of the vehicle, and the rotational axis of a main transmission mechanism is disposed parallel with the rotational axis of the auxiliary transmission mechanism, the input shaft of the main transmission mechanism being rotationally coupled with the output shaft of the auxiliary transmission mechanism. The output shaft of the main transmission mechanism is rotationally coupled with a differential gear device which has its output shafts rotationally coupled with front wheel axle shafts. The auxiliary transmission gear mechanism constitutes an overdrive or an underdrive (reducing) mechanism.

4 Claims, 3 Drawing Sheets

AUTOMATIC TRANSMISSION FOR MOTOR VEHICLES

This is a continuation of application Ser. No. 919,576 filed Oct. 15, 1986, which is a continuation of application Ser. No. 820,834 filed Jan. 21, 1986, which is a continuation of application Ser. No. 256,179 filed Apr. 21, 1981.

BACKGROUND OF THE INVENTION

1. Field of the Invention

This invention relates generally to an automatic transmission for motor vehicles having a hydraulic torque converter, an auxiliary transmission mechanism forming an overdrive or underdrive (reducing) mechanism and a main transmission mechanism with a plural number of forward ranges and a reverse range, and more particularly to an automatic transmission for front engine-front drive type motor vehicles (hereinafter referred to as "F.F. vehicles" for brevity) which have axle shafts of front wheels driven from a transversely mounted internal combustion engine having its rotational axis disposed transversely to the body length of the vehicle.

2. Description of the Prior Art

In an automatic transmission for motor vehicles, a hydraulic torque converter and a transmission gear mechanism with a number of forward ranges and a reverse range are generally coaxially coupled with the crankshaft of an internal combustion engine.

In F.F. vehicles having the crankshaft of an internal combustion engine disposed transversely of the vehicle body, it is the usual practice to mount also in a transversely oriented position a block which assembles together an internal combustion engine, a torque converter and a transmission gear mechanism. However, in a case where an automatic transmission of this sort is mounted on a small motor vehicle which has a limited engine room space, a difficulty is often encountered in finding a space for an auxiliary transmission mechanism such as an overdrive or underdrive (reducing) mechanism which serves to improve the operational efficiency or to increase the speed ranges of the transmission, or a space for mounting a direct-coupling clutch to the hydraulic torque converter for improving the fuel consumption.

What is needed is an automatic transmission for a front engine-front drive type motor vehicle which includes an auxiliary transmission mechanism such as an overdrive or underdrive mechanism and a direct coupling clutch for the hydraulic torque converter for improving fuel consumption.

SUMMARY OF THE INVENTION

It is a primary object of the present invention to provide a compact automatic transmission for motor vehicles having, along with a hydraulic torque converter and a main transmission gear mechanism with a plural number of forward ranges and a reverse range, an auxiliary transmission gear mechanism constituting an overdrive mechanism of a speed reduction ratio smaller than 1 or an underdrive mechanism having a speed reduction ratio greater than 1.

It is another object of the present invention to provide a compact automatic transmission for motor vehicles of the type mentioned above, in which the auxiliary transmission mechanism is provided coaxially with the hydraulic torque converter and in parallel relation with the main transmission mechanism, transmitting power from the torque converter to the main transmission mechanism through the auxiliary transmission mechanism.

A further object of the present invention is to provide an automatic transmission for F.F. vehicles, in which the output shaft of the main transmission mechanism, positioned in parallel with the auxiliary transmission mechanism, is coupled with axle shafts of front wheels through a differential gear device.

According to the present invention, there is provided an automatic transmission for motor vehicles having a hydraulic torque converter, an auxiliary transmission mechanism mounted coaxially with the torque converter, means for transmitting power from the torque converter to the auxiliary transmission mechanism, a main transmission mechanism having a rotational axis in parallel relation with the rotational axis of the auxiliary transmission mechanism and having a plural number of forward ranges and a reverse range, means for connecting the output shaft of the auxiliary transmission mechanism with an input shaft of the main transmission mechanism, and means for connecting the output shaft of the main transmission gear mechanism with axle shafts of front wheels through a differential gear device, whereby the auxiliary transmission mechanism constituting an overdrive or an underdrive (reducing) mechanism is mounted additionally to a conventional automatic transmission having a hydraulic torque converter and a transmission mechanism with a plural number of forward speed ranges and a reverse range, without increasing longitudinal dimensions of the transmission. Mounting on a small-size motor vehicle is practicable while augmenting the speed ranges of the transmission. Moreover, the transmission construction still has room for providing a direct-coupling clutch for the hydraulic torque converter, so that the fuel consumption of the motor vehicle is improved by providing the direct-coupling clutch together with the auxiliary transmission mechanism in the automatic transmission.

Still other objects and advantages of the invention will in part be obvious and will in part be apparent from the specification.

The invention according comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF PREFERRED EMBODIMENTS

Figure 1:
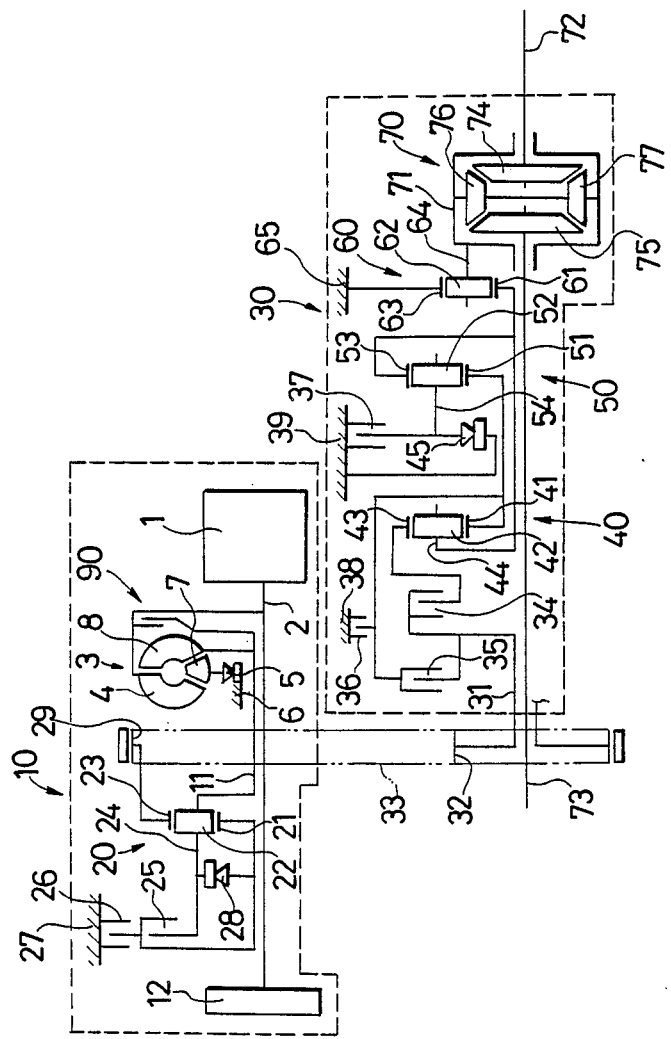
FIG. 1 is a diagramatic representation of an automatic transmission for a motor vehicle in accordance with the invention.

The invention is now illustrated more particularly by way of some preferred embodiments shown in the drawings. Referring first to FIG. 1, there is shown an embodiment which applies the present invention to an F.F. type motor vehicle having a crankshaft 2 of an internal combustion engine 1 connected to a hydraulic torque converter 3. The hydraulic torque converter 3, which is of known construction, is provided with a pump impeller 4 which is coupled with the crankshaft 2, a stator 7 which is connected to a stationary portion 6 through a one-way clutch 5, and a turbine runner 8. Further, a direct-coupling clutch 90 is provided for direct coupling of the crankshaft 2 and an input shaft 11.

An auxiliary transmission gear mechanism 10 is provided coaxially with the crankshaft 2 to constitute an overdrive mechanism in this particular embodiment. The input shaft 11 of the auxiliary transmission mechanism 10 which extends coaxially with the crankshaft 2 is coupled with the turbine runner 8. The auxiliary transmission mechanism 10 has a planetary gear system 20 which consists of a sun gear 21, planet-pinions 22, a ring gear 23 and a carrier 24 which rotatably supports the planet-pinions 22. The carrier 24 is coupled with the input shaft 11, and a clutch 25 controls engagement between the carrier 24 and sun gear 21, while a brake 26 controls engagement between the sun gear 21 and a stationary portion 27 of the transmission housing. A one-way clutch 28 controls engagement of the carrier 24 with the sun gear 21. The ring gear 23 which forms an output element of the auxiliary transmission gear mechanism 10 is coupled with a sprocket wheel 29.

An oil pump 12 which is driven by the crankshaft 2 is located on the outer side of the auxiliary transmission mechanism 10 remote from the hydraulic torque converter 3.

A main transmission gear mechanism 30 which is located in parallel relation with the crankshaft 2 constitutes in this particular embodiment an underdrive mechanism with three forward ranges and a reverse range. An input shaft 31 of the main transmission mechanism 30 is coupled with a sprocket wheel 32 which is linked with the sprocket wheel 29 by a chain 33. Output power of the auxiliary transmission mechanism 10 is transmitted to the input shaft 31 of the main transmission mechanism 30 through the sprocket wheel 29, the chain 33 and the sprocket wheel 32. The main transmission mechanism 30 has planetary gear systems 40 and 50 which respectively consist of a sun gear 41, 51, planet-pinions 42, 52, a ring gear 43, 53 and a carrier 44, 54 which rotatably supports the planet-pinions 42, 52. The input shaft 31 is releasably coupled with the ring gear 43 through a clutch 34 and with the sun gears 41 and 51 through a clutch 35. A brake 36 controls engagement of the sun gears 41 and 51 with a stationary portion 38 of the transmission housing. A brake and a one-way clutch 45 control engagement between the carrier 54 and a stationary portion 39, of the transmission housing. The carrier 54 which is coupled with the ring gear 53 is also coupled with a sun gear 61 of a final reducer 60. The final reducer 60 consists of the sun gear 61, planet-pinions 62, a ring gear 63 and a carrier 64 which rotatably supports the planet-pinions 62. The ring gear 63 is connected to a stationary portion 65 of the transmission housing, while the carrier 64 is connected to a shaft casing 71 of a differential gear device 70.

The differential device 70 which is of known construction is coupled with axle shafts 72 and 73 of front wheels (not shown). The shaft casing 71 which rotatably supports pinions 76 and 77 in meshing engagement with side gears 74 and 75 is coupled with the carrier 64.

The operational ranges of the above-described automatic transmission are illustrated in the following table.

TABLE

| Shift positions | 25 | 26 | 28 | 34 | 35 | 36 | 37 | 45 |
|---|---|---|---|---|---|---|---|---|
| 1st speed | o | | x | o | | | o | x |
| 2nd speed | o | | x | o | | o | | |
| 3rd speed | o | | x | o | o | | | |
| 4th speed | | o | | o | o | | | |
| Reverse | o | | x | | o | | o | |

In the foregoing table, the respective numerals corresponds to the reference numerals of the clutches, the brakes and the one-way clutches, and the symbol "o" indicates the engaged state of a clutch or brake and symbol "x" indicates a restrained state of a one-way clutch. The engagement and release of each clutch and brake are controlled by a corresponding hydraulic servo motor (not shown) which receives supplies of pressurized operating fluid from a hydraulic control system (not shown).

The operations in the respective speed ranges are as follows.

In the forward 1st speed, the clutches 25 and 34 and the one-way clutches 28 and 45 are actuated. The power from the crankshaft 2 is transmitted to the input shaft 11 through the torque converter 3, and thus to the carrier 24 of the planetary gear system 20. At this time, since the clutch 25 and the one-way clutch 28 are in actuated state, the whole planetary gear system 20 is rotated integrally and the sprocket wheel 29 which is coupled with the ring gear 23 is also rotated. The rotation of the sprocket wheel 29 is transmitted through the chain 33 to the sprocket wheel 32 to rotate the input shaft 31 of the main transmission mechanism 30. The rotation of the input shaft 31 is transmitted to the ring gear 43 through the clutch 34. While, the carrier 54 is put in rotation in a direction reverse to the input shaft 31 but its rotation is blocked by the one-way clutch 45, so that the ring gear 53 is rotated in the same direction as the input shaft 31 to rotate the sun gear 61 of the final reducer 60. Simultaneously, the carrier 44 is rotated in the same direction, superposing its rotational force on the sun gear 61 to drive the same by combined rotational forces. The rotation of the sun gear 61 is then transmitted to the front wheel axle shafts 72 and 73 through the final reducer 60 and differential device 70. In a case where engine braking effect is desired to be applied, for example, in a downhill operation, however, brake 37 is actuated to block the rotation of the carrier 54 since it is difficult to block its rotation by the one-way clutch 45 alone.

In the forward 2nd speed range, the clutches 25 and 34 the brake 36 and the one-way clutch 28 are in the actuated state. The power from the crankshaft 2 is transmitted to the input shaft 31 of the main transmission mechanism 30 in the same manner as in the forward 1st speed range. The rotation of the input shaft 31 is transmitted to the ring gear 43, while the sun gear is put in rotation in a direction reverse to the ring gear 43 but its rotation is blocked by the actuation of the brake 36, so that the planet-pinions 42 revolve both round the sun gear 41 in a same direction with the input shaft 31 and on their axis respectively, thereby the carrier 44 is rotated in the same direction with the input shaft 31 to transmit the rotation to the front wheel shafts 72 and 73 through the final reducer 60 and the differential device 70.

In the forward 3rd speed range, the clutches 25, 34 and 35 and the one-way clutch 28 are in the actuated state. The power from the crankshaft 2 is transmitted to the input shaft 31 of the main transmission mechanism 30 in the same manner as in the forward 1st speed range. The rotation of the input shaft 31 is transmitted to the ring gear 43 and the sun gear 41 through the clutches 34 and 35. Therefore, in the planetary gear system 40, the rotations in the same direction of the ring gear 43 and the sun gear 41 cause the planet-pinions 42 to rotate together and integrally with the ring gear 43 and the sun gear 41, thereby rotating the carrier 44 to transmit the rotation to the sun gear 61 of the final reducer 60 and then to the front wheel axle shafts 72 and 73 through the final reducer 60 and the differential device 70.

In the forward 4th speed range, the clutches 34 and 35 and the brake 26 are in the actuated state, the power of the crankshaft 2 is transmitted to the input shaft 11 and the carrier 24 through the torque converter 3. In this instance, the sun gear 21 is held stationary by the actuation of the brake 26, so that the rotation of the ring gear 23 which is now rotated at an increased speed through the rotation of the carrier 24 is transmitted to the input shaft 31 of the main transmission mechanism 30. Similarly to the forward 3rd speed range, the rotation of the input shaft 31 is transmitted to the front wheel axle shafts 72 and 73 through the main transmission mechanism 30, the final reducer 60 and the differential device 70.

In the reverse range, the clutches 25 and 35 as well as the brake 37 and the one-way clutch 28 are in the actuated state, so that the power from the crankshaft 2 is transmitted to the input shaft 31 of the main transmission mechanism 30 in the same manner as in the forward 1st speed range. The rotation of the input shaft 31 is transmitted to the sun gears 41 and 51 through the clutch 35. In this instance, as the carrier 54 is held stationary by the actuation of the brake 37, the ring gear 53 is put in rotation by the sun gear 51 through the planet-pinions 52 in a direction reverse to the input shaft 31, transmitting the reverse rotation to the sun gear 61 of the final reducer 60, and then to the front wheel axle shafts 72 and 73 through the final reducer 60 and differential device 70.

Figure 2:
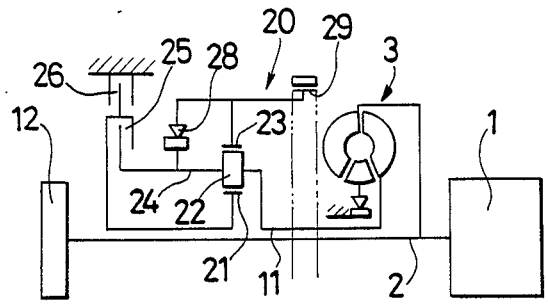
FIGS. 2 and 3 are diagramatic representations of alternative embodiments of an auxiliary transmission gear mechanism for the transmission of FIG. 1.

FIG. 2 illustrates an alternate embodiment of the auxiliary transmission mechanism 10 in which like parts are designated by like reference numerals and their explanations are omitted. In this embodiment, the auxiliary transmission mechanism 10 constitutes an overdrive mechanism, with the one-way clutch 28 located between the carrier 24 and the ring gear 23.

Figure 3:
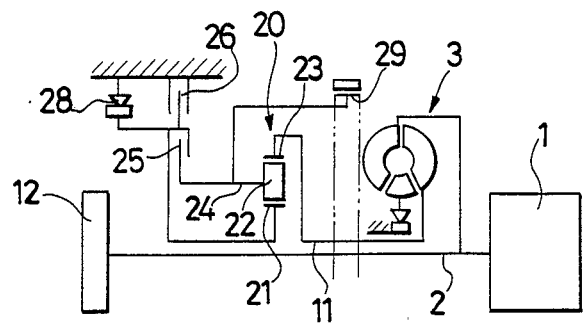

FIG. 3 shows still another alternate embodiment of the auxiliary transmission mechanism 10, which constitutes an underdrive mechanism with a reduction ratio greater than 1. In this case, the input shaft 11 is coupled with the ring gear 23, and the carrier 24 is coupled with the sprocket, wheel 29. The sun gear 21 is releasably coupled with the carrier 24 through the clutch 25 and with the stationary portion 27 of the transmission housing through the brake 26 and the one-way clutch 28. Upon engaging the clutch 25, the whole planetary gear system 20 is rotated integrally, transmitting the rotation of the input shaft 11 to the carrier 24. When the brake 26 is actuated, the rotation of the input shaft 11 is transmitted to the carrier 24 at a reduced speed.

Figure 4:
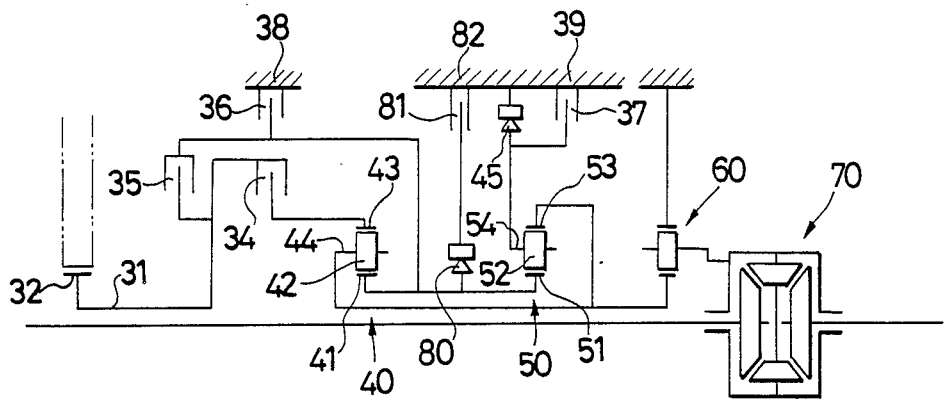
FIGS. 4, 5 and 6 are diagramatic representations of alternative embodiments of the main transmission gear mechanism of the automatic transmission of FIG. 1.
Figure 5:
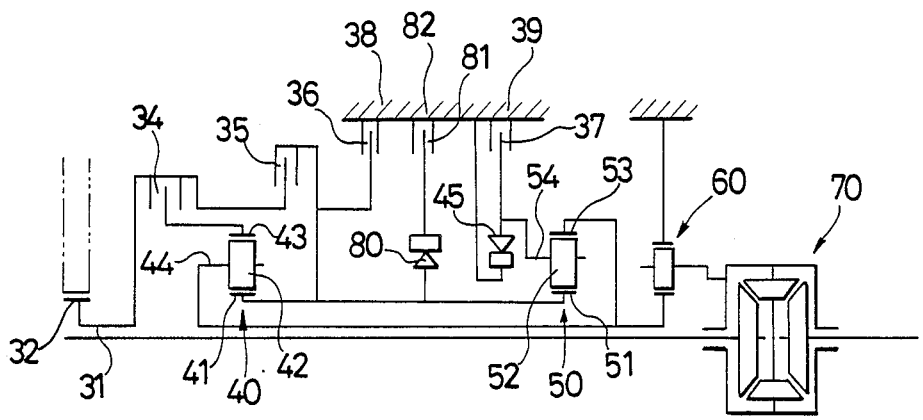
Figure 6:
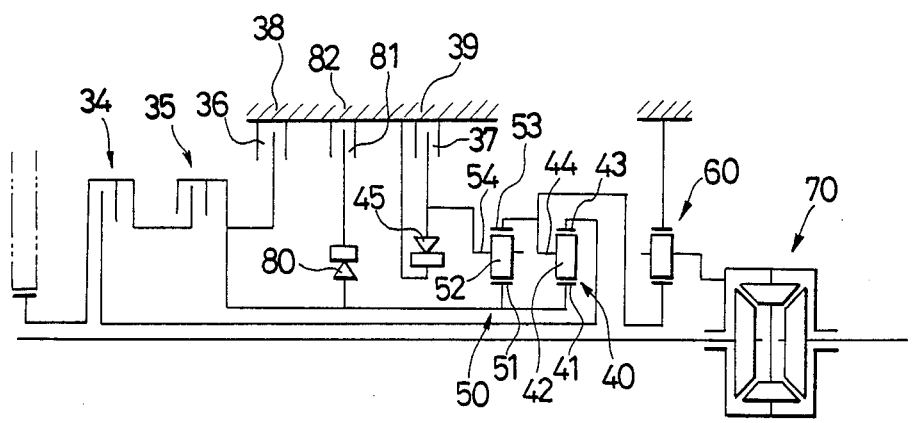

FIGS. 4 to 6 illustrate alternative embodiments of the main transmission mechanism 30, wherein those component parts which have correspondents in FIG. 1 are designated by similar reference numerals to avoid repetition of explanations. In these particular embodiments of the main transmission mechanism, a brake 81 is provided parallel with the brake 36 for connecting and disconnecting the sun gears 41 and 51 with the stationary portion 82 of the transmission housing through a one-way clutch 80.

As clear from the foregoing description, the present invention provides an automatic transmission for motor vehicles having an overdrive or underdrive mechanism parallel with the conventional 3-speed transmission mechanism. Thus, according to the present invention, it becomes possible to increase the speed ranges of automatic transmission for F.F. vehicles or to employ a torque converter with a direct-coupling clutch.

What is claimed is:

1. An automatic transmission for a motor vehicle, comprising:
   a transmission housing;
   a hydraulic torque converter having rotational axes, an input shaft, an output shaft and a direct coupling clutch for directly coupling said input shaft to said output shaft;
   an auxiliary transmission mechanism provided coaxially with said hydraulic torque converter and having an input shaft, an output shaft with an input end and an output end and an overdrive mechanism of planetary gear type having a reduction ratio smaller than 1, said input shaft and said output shaft of said auxiliary transmission being located close to and on the side of said hydraulic torque converter with respect to said auxiliary transmission, respectively, and being coupled with a planetary gear carrier and a ring gear of said overdrive mechanism, respectively, a one-way clutch being provided between said planetary gear carrier and a sun gear of said overdrive mechanism, a clutch being provided between said planetary gear carrier and a position radially and outwardly of said one-way clutch for engaging and disengaging said planetary carrier and said sun gear, a brake being provided between said transmission housing and said sun gear and positioned radially and outwardly of said clutch for controlling engagement of said sun gear with a stationary portion of said transmission housing, and the output end of said output shaft being disposed between said auxiliary transmission mechanism and said hydraulic torque converter;
   means for coupling said output shaft of said hydraulic torque converter to said input shaft of said auxiliary transmission mechanism;
   a main transmission mechanism having an input shaft and an output shaft, said main transmission mechanism having rotational axes thereof disposed parallel with the rotational axes of said hydraulic torque converter and having a plural number of forward speed ranges and a reverse range;
   means for transmitting the rotation of said output shaft of said auxiliary transmission mechanism to said input shaft of said main transmission including a sprocket wheel fixed on said output end of said output shaft of said auxiliary transmission mechanism, a sprocket wheel fixed on said input shaft of said main transmission mechanism and a chain means provided to link said two sprocket wheels rotationally and extending in a transverse direction to the rotational axes of said input and output shafts of said auxiliary transmission and main transmission mechanism;

a differential device having an input shaft and output shafts adapted for use as front wheel axles and disposed coaxially with the rotational axes of said main transmission mechanism;

means for transmitting the rotation of said output shaft of said main transmission mechanism to said input shaft of said differential device, said wheel axles being driven through said differential device; and wherein said auxiliary transmission mechanism and said main transmission mechanism are disposed on opposite sides of said chain means.

2. An automatic transmission as claimed in claim 1 and further comprising an oil pump located coaxially on one side of said auxiliary transmission mechanism remote from said hydraulic torque converter and being driven by the input shaft of said hydraulic torque converter.

3. An automatic transmission for a motor vehicle, as claimed in claim 1, wherein said auxiliary transmission mechanism is provided with an auxiliary transmission gear mechanism having an output shaft, and wherein an output end of said auxiliary transmission gear mechanism output shaft serves as the output end of the output shaft of the auxiliary transmission mechanism.

4. An automatic transmission for a motor vehicle, as claimed in claim 1, wherein said main transmission mechanism includes a transmission gear mechanism having an input shaft with an output end; and wherein the input shaft of said transmission gear mechanism serves as the input shaft of the main transmission mechanism; and wherein the sprocket wheel which is fixed on said input shaft of said main transmission is connected to the output end of the input shaft of said transmission gear mechanism.

* * * * *